United States Patent [19]
Jackson et al.

[11] Patent Number: 5,561,779
[45] Date of Patent: Oct. 1, 1996

[54] PROCESSOR BOARD HAVING A SECOND LEVEL WRITEBACK CACHE SYSTEM AND A THIRD LEVEL WRITETHROUGH CACHE SYSTEM WHICH STORES EXCLUSIVE STATE INFORMATION FOR USE IN A MULTIPROCESSOR COMPUTER SYSTEM

[75] Inventors: Michael T. Jackson, Houston; Walter G. Fry, Spring, both of Tex.

[73] Assignee: Compaq Computer Corporation, Houston, Tex.

[21] Appl. No.: 237,779

[22] Filed: May 4, 1994

[51] Int. Cl.$^6$ .................................................. G06F 12/08
[52] U.S. Cl. ......................... 395/449; 395/457; 395/469; 395/470; 395/471; 395/472; 395/473; 364/DIG. 1; 364/243.45
[58] Field of Search ............................ 364/200 MS File, 364/900 MS File; 395/425, 449, 457, 469, 470, 472, 473, 471

[56] References Cited

U.S. PATENT DOCUMENTS

| | | | |
|---|---|---|---|
| 3,964,054 | 6/1976 | Annunziata et al. | 395/449 |
| 4,442,487 | 4/1984 | Fletcher et al. | 395/449 |
| 5,136,700 | 8/1992 | Thacker | 395/449 |
| 5,214,765 | 5/1993 | Jensen | 395/449 |
| 5,282,272 | 1/1994 | Guy et al. | 395/275 |
| 5,359,723 | 10/1994 | Matthews et al. | 395/425 |

FOREIGN PATENT DOCUMENTS

WO94/08303  4/1994  WIPO.

OTHER PUBLICATIONS

Weiss, Ray *Interlis Pentium finally arrives*, EDN, vol. 38 No. 7, p. 66(3), Mar. 31, 1993.

Pomerene et al., Second Level Cache For MP Systems, IBM Technical Disclosure Bulletin, vol. 27, No. 1A, Jun. 1984, pp. 298–300.

Mori et al., A Distributed Shared Memory Multiprocessor: Asura–Memory And Cache Architectures–, Proceedings Supercomputing '93, Nov. 15, 1993, pp. 740–749.

*Primary Examiner*—Matthew M. Kim
*Attorney, Agent, or Firm*—Pravel, Hewitt, Kimball & Krieger

[57] ABSTRACT

A computer system which utilizes processor boards including a first level cache system integrated with the microprocessor, a second level external cache system and a third level external cache system. The second level cache system is a conventional, high speed, SRAM-based, writeback cache system. The third level cache system is a large, writethrough cache system developed using conventional DRAMs as used in the main memory subsystem of the computer system. The three cache systems are arranged between the CPU and the host bus in a serial fashion. Because of the large size of the third level cache, a high hit rate is developed so that operations are not executed on the host bus but are completed locally on the processor board, reducing the use of the host bus by an individual processor board. This allows additional processor boards to be installed in the computer system without saturating the host bus. The third level cache system is organized as a writethrough cache. However, the shared or exclusive status of any cached data is also stored. If the second level cache performs a write allocate cycle and the data is exclusive in the third level cache, the data is provided directly from the third level cache, without requiring an access to main memory, reducing the use of the host bus.

8 Claims, 12 Drawing Sheets

5,561,779

PROCESSOR BOARD HAVING A SECOND LEVEL WRITEBACK CACHE SYSTEM AND A THIRD LEVEL WRITETHROUGH CACHE SYSTEM WHICH STORES EXCLUSIVE STATE INFORMATION FOR USE IN A MULTIPROCESSOR COMPUTER SYSTEM

BACKGROUND OF THE INVENTION

1. Field of the Invention

The invention relates to cache systems used in computer systems, and more particularly to a write through third level cache system used with a write back second level cache system, the third level cache including caching of the shared or exclusive nature of the data.

2. Description of the Related Art

Computer systems are getting ever more powerful. Originally personal computers used a simple 8 and 16 bit microprocessor at a relatively slow clock rate. As the capabilities of the microprocessors and subsystems improved, so did system performance. 16 and 32 bit microprocessors were used and clock rates increased from 2 or 4.77 MHz to 66 MHz. Memory speeds increased, though not quite at the same rate as the performance increase in the microprocessors. To partially alleviate this lag, memory system architectures became more elaborate. Cache memory systems were used to bridge the speed gap. Eventually a cache system was integrated unto the microprocessor, with second level external cache systems being used in performance oriented cases. This use of cache systems improved system performance at some increase in complexity. However, the performance gains were still limited because of the fact that only one processor was present.

A second way to increase performance was to use multiple processors. Originally file servers and UNIX hosts used single processor personal computers. This was adequate in the beginning, but user performance demands required more. Ultimately multiprocessor units were developed. This partially resolved the problem of only one microprocessor but developed different problems. Originally the units were asymmetric, due to limitations in the various components, but later designs became symmetric. These symmetric multiprocessors (SMPs) became quite powerful. But as the microprocessors continued to increase in performance, the bus connecting the processors became a major limiting factor. The very high performance processors readily saturated the bus, so that adding another processor not only did not add performance, it might actually decrease performance. The bus limited the scalability of the system. Therefore yet another design limitation had been reached, limiting performance increases in the system. It is then clearly desirable to avoid this saturation of the common or host bus, allowing more processors to be added, improving the scalability and total performance of the computer system.

SUMMARY OF THE PRESENT INVENTION

A computer system according to the present invention utilizes processor cards or boards including a first level cache system integrated with the microprocessor, a second level external cache system and a third level external cache system. The second level cache system is a conventional, high speed, SRAM-based, writeback cache system. The third level cache system is a large, writethrough cache system developed using conventional DRAMs as used in the main memory subsystem of the computer system.

The three cache systems are arranged between the CPU and the host bus in a serial fashion, where first the first level cache is examined, then the second level cache and then the third level cache. This serial arrangement actually slows down operations of a single processor system when an access must be made to the main memory subsystem because three, not two, cache systems must be examined for a hit and none of these checks are done in parallel. Further, the use of DRAMs to form the data store for the third level cache does not provide a speed increase over the main memory system once a hit is determined. However, because of the large size of the third level cache, a high hit rate is developed. This high hit rate means that those operations are not executed on the host bus but are completed locally on the processor board. Thus there is a reduction in the use of the host bus by an individual processor board. This allows additional processor boards to be installed in the computer system without saturating the host bus. The additional processors provide a system performance improvement significantly greater than the performance reduction on each particular processor board due to the presence of the third level cache. Thus the third level cache system allows an overall system performance increase by reducing use of the host bus. As noted, the third level cache system is organized as a writethrough cache. However, the shared or exclusive status of any cached data is also stored. While this information is commonly stored in a writeback organization, it is not necessary in a writethrough organization. In this case, the third level cache is working with a second level writeback cache.

One operation which occurs with the second level cache is referred to as a write allocation. This operation develops when the processor writes less than a full line. The second level cache must obtain or allocate the full line prior to caching the partial line write. By having the third level cache monitor the exclusive status, if the line requested is contained in the third level cache and is exclusive, the data can be provided directly from the third level cache, without requiring an access to main memory, as would be required if the exclusive status was not known. Thus write allocate cycles to exclusive lines are not propagated to the host bus, further reducing the use of the host bus and allowing overall system improvement in excess of that developed by just adding the third level cache.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
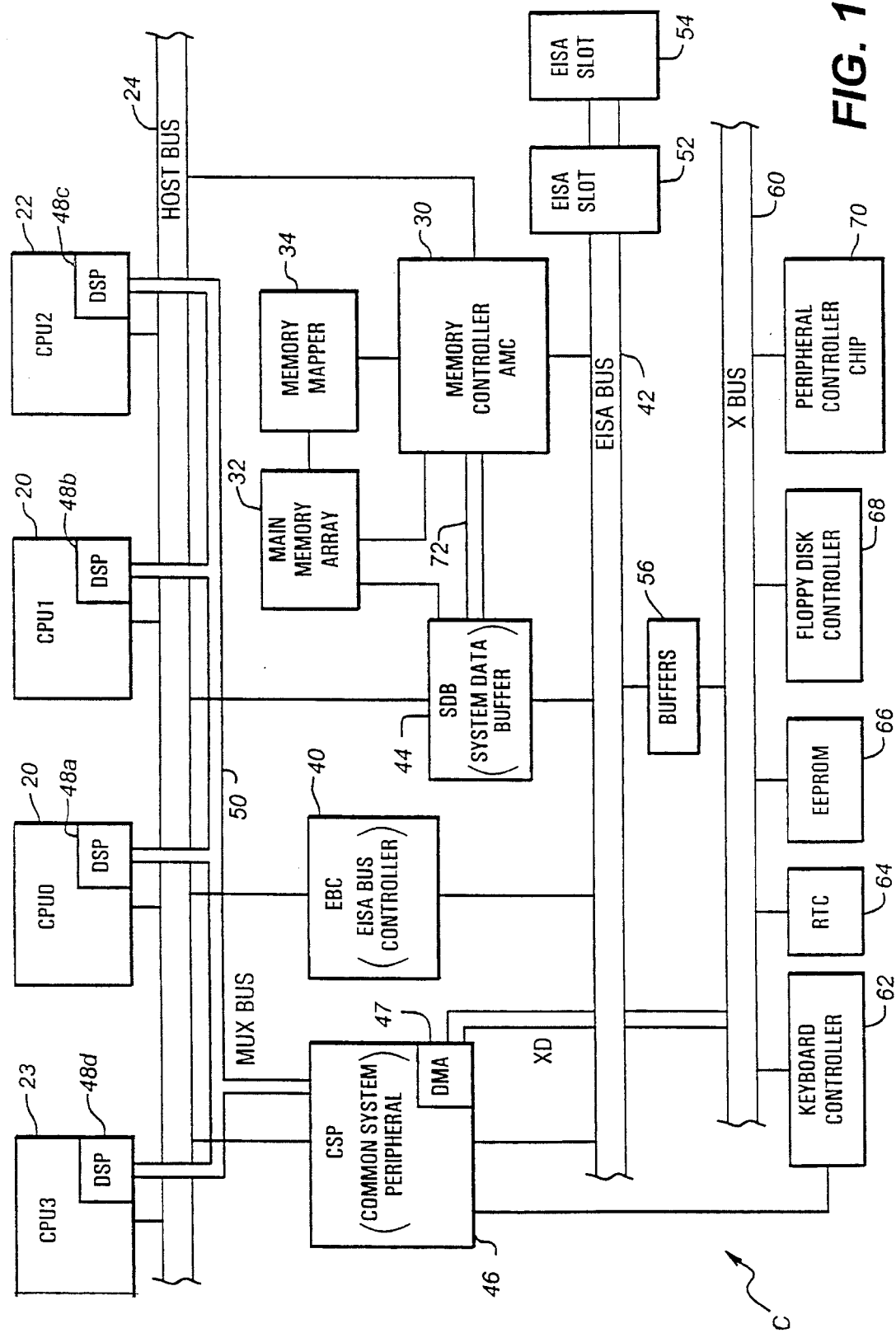
FIG. 1 is a block diagram of a computer system incorporating the present invention.

Referring now to FIG. 1, a computer system C is shown incorporating a third level cache according to the present invention. The computer system C is preferably a multiprocessor system, although a computer system according to the present invention may include more processors or may be a single processor system. The elements of the computer system C that are not significant to the present invention, other than to illustrate an example of a fully configured computer system, are not discussed in detail.

The computer system C preferably includes four central processing units (CPUs), referred to as CPU 20, CPU 21, CPU 22 and CPU 23, respectively, which are connected to a host bus 24. The host bus 24 preferably includes a host clock signal referred to as HCLK, which is preferably approximately 33 MHz. In the preferred embodiment, CPU 20 is logically assigned the position of CPU0, CPU 21 is logically assigned the position of CPU1, CPU 22 is assigned logical CPU2, and CPU 23 is logically assigned the position of CPU3, although these assignments are preferably programmable and may be changed. A memory controller 30 is coupled to the host bus 24 to an expansion bus 42, where the expansion bus 42 is preferably the Extended Industry Standard Architecture (EISA) bus, although other types of expansion buses are contemplated. The memory controller 30 is also coupled to a main memory array 32, where the memory array 32 preferably comprises dynamic random access memory (DRAM). A data destination facility (DDF), otherwise known as memory mapper logic 34, is coupled to the memory controller 30 and the memory array 32, and provides memory mapping functions to facilitate memory accesses to the memory array 32. An underline at the end of a signal name denotes negative logic where the signal is asserted low and negated high. An exclamation point at the start of a signal name indicates the inverse of the signal.

The computer system C includes an EISA bus controller (EBC) 40, which is coupled between the host bus 24 and the EISA bus 42. The EBC 40 provides various bus cycle translation and conversion functions to facilitate transfers between the host bus 24 and the EISA bus 42. A system data buffer (SDB) 44 is coupled to the host bus 24, the EISA bus 42, the memory controller 30 and the memory array 32. The connection between the SDB 44 and the memory controller 30 is preferably a memory bus 72, which includes 144 bits preferably comprising 128 data bits and 16 error check bits. The SDB 44 functions to buffer and transfer data between the host bus 24 and the memory array 32, between the host bus 24 and the EISA bus 42 and between the EISA bus 42 and the memory array 32.

A logic block referred to as the central system peripheral (CSP) 46 is coupled between the host bus 24 and the EISA bus 42. The CSP 46 is coupled to logic blocks referred to as the distributed system peripherals (DSPs) 48a, 48b, 48c and 48d in the CPUs 20, 21, 22 and 23, respectively, through a multiplexed (MUX) bus 50. For more information on the operation of the MUX bus 50, please see related copending application Ser. No. 07/955,482, entitled MULTIPLEXED COMMUNICATION PROTOCOL BETWEEN CENTRAL AND DISTRIBUTED PERIPHERALS IN MULTIPROCESSOR COMPUTER SYSTEMS, filed Oct. 2, 1992, which is hereby incorporated by reference. For more information on the CSP 46 and the DSPs 48a, 48b, 48c and 48d, please see related U.S. Pat. No. 5,436,792, entitled ARRANGEMENT OF DMA, INTERRUPT AND TIMER FUNCTIONS TO IMPLEMENT SYMMETRICAL PROCESSING IN A MULTIPROCESSOR COMPUTER SYSTEM, granted Jul. 25, 1995, which is hereby incorporated by reference. The CSP 46 is also coupled to a keyboard controller 62. The CSP 48 includes a direct memory access (DMA) controller 47 which is preferably implemented as a true EISA bus controller, and will be used to illustrate cycles initiated on the EISA bus 42 to the host bus 24 accessing the memory array 32.

The EISA bus 42 includes a plurality of EISA slots 52 and 54 for receiving EISA expansion cards, such as network interface or hard disk interface cards for example. EISA bus masters may reside on these EISA expansion cards plugged into the EISA slots 52 and 54. The EISA bus 42 is coupled through buffers 56 to a bus referred to as the X bus 60. A number of peripheral devices are coupled to the X bus 60, including the keyboard controller 62, a real time clock (RTC) 64, an electrically erasable programmable read only memory (EEPROM) 66, a floppy disk controller 68, and a peripheral controller chip 70 which includes numerous parallel ports and UARTS (universally a synchronous receiver/transmitters). The CSP 46 is coupled to an 8-bit data bus of the X bus 60 referred to as XD.

Figure 2:
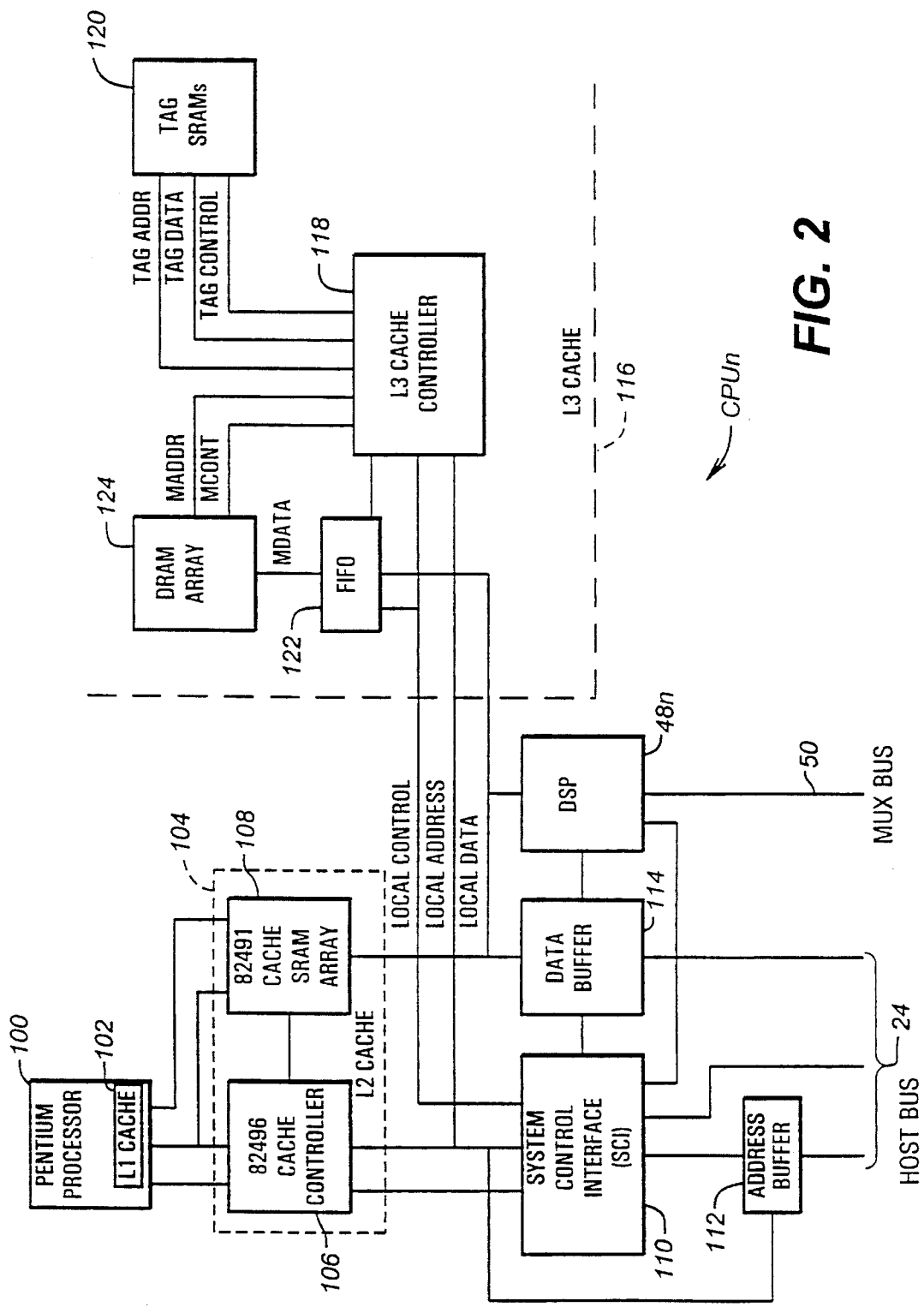
FIG. 2 is a block diagram of the central processing units (CPUs) of FIG. 1.

The CPUs 20, 21, 22 and 23 are preferably identical, though different designs can be mixed. The preferred embodiment for the CPUs 20, 21, 22 and 23 is shown in FIG. 2. A microprocessor 100, preferably a Pentium processor from Intel Corp., includes a L1 or first level cache 102. The microprocessor 100 is connected to an L2 or second level cache 104. Preferably the L2 cache 104 is formed using the 82496 cache controller 106 and an array of 82491 cache SRAMs 108 from Intel Corp. Familiarity with the Pentium, the 82496 and the 82491 is assumed in this discussion. For details on these devices, please refer to the appropriate device handbooks from Intel. The L2 cache 104 is connected as suggested by the manufacturer. The 82496 cache controller 106 is a writeback cache controller configured to operate with the Pentium processor.

The 82496 cache controller 106 is implemented to follow a modified exclusive shared invalid (MESI) protocol, where each of the cache subsystems may be the exclusive owner of data which was originally read from the memory array 32. The CPUs 20, 21, 22 or 23 may modify the data within its cache memory so that the new data is not the same as the data in the corresponding memory location in the memory array 32. The CPU 20, 21, 22 or 23 is then the exclusive owner of the data at that particular memory address and is responsible for maintaining the correctness of the data provided in any future read operations to that address. Also, the owner CPU must inform the other CPU having data from the corresponding data address of the cycle so that the other CPU can determine that its data is now valid.

Thus, if one of the CPUs 20, 21, 22 or 23 attempts to access data from the memory array 32 that is dirty, the owner CPU detects this read request, causes the other CPU that is on the host bus 24 to temporarily abort its access and the owner CPU 22 updates or writes-back the owned data to the memory array 32. In the preferred embodiment, the writeback is to an entire line of data, where each line is preferably 512 bits or 64 bytes. The 82496 cache controller 106 incorporates snooping logic to maintain the MESI state and to cause writeback operations.

The L2 cache 104 must be connected to the host bus 24 by suitable interface hardware. This is primarily accomplished using a system control interface or SCI 110. The SCI 110 performs translation of cycles between the L2 cache 104 and the host bus 24 and otherwise controls the operations between the two units. The SCI 110 controls an address buffer 112 which is connected to the host bus 24 and to the L2 cache 104. The SCI 110 further controls a data buffer 114 which is connected between the host bus 24 and the data bus portion of the L2 cache 104. The SCI 110 further controls the DSP 48 contained on the CPU card. The DSP 48 is connected to the MUX bus 50. The SCI 110 can operate as indicated in the Intel manuals relating to connection of the L2 cache 104 to the host bus 24 or can include other features as illustrated and described in U.S. Pat. No. 5,367,689, entitled "APPARATUS FOR STRICTLY ORDERED INPUT/OUTPUT OPERATIONS FOR INTERRUPT SYSTEM INTEGRITY", U.S. Pat. No. 5,353,415, entitled "METHOD AND APPARATUS FOR CONCURRENCY OF BUS OPERATIONS", granted Oct. 4, 1994, and U.S. Pat. No. 5,463,753, entitled "METHOD AND APPARATUS FOR NON-SNOOP WINDOW REDUCTION", granted Oct. 31, 1995, which are hereby incorporated by reference.

In addition, the CPU contains a third level or L3 cache 116. Preferably the L3 cache 116 is present on a daughtercard and is thus removable from the processor circuit board forming CPUn, while the processor 100 and the L2 cache 104 are located on the processor circuit board. A signal to the SCI 110 is grounded when the L3 cache 116 is present. The CPUn circuit board is preferably a board which is smaller than a standard ISA card, preferably having the dimensions of 11" by 5", and the daughtercard is smaller than the circuit board to overlay portions of the circuit board and not extend past the circuit board having dimensions of 7" by 4½. The connection to the host bus 24 is preferably made via a slot and edge connector arrangement, allowing the processors boards to be easily added or removed or interchanged in the computer system C. As shown in FIG. 1, four CPUs are indicated but this can be any number from zero to four. Other embodiments could have any number of CPUs. The preferred embodiment of the present invention is particularly relevant to designs having three or four processors of the Pentium class because it is at that level of microprocessor capability that the activity level of the host bus 24 begins to develop saturation problems.

The L3 cache 116 includes an L3 or third level cache controller 118 which is connected to the local control and local address buses provided from the SCI 110 and the L2 cache 104. A series of tag SRAMs 20 are connected the L3 cache controller 118 to allow storage of tag information as is necessary in a cache system. Configuration of the tag SRAMs 120 is described in more detail below. A bidirectional FIFO 122 is connected between the local data bus which is connected to the L2 cache controller 104 and a DRAM array 124. Preferably the DRAM array 124 is two or four MB of 70 nanosecond DRAM devices. This is typically approximately the same speed as the DRAM devices which form the main memory array 32. The DRAM array 124 is connected to the L3 cache controller 118 to receive the address and control signals. The SCI 110 in particular has a connection to the L3 cache controller 118 to receive a hit or miss indication from the L3 cache controller 118 so that if a miss is indicated, the SCI 110 will transfer the cycle from the L2 cache 104 through to the host bus 24. If a hit is indicated, then the SCI 110 does not transfer the cycle to the host bus 24 but instead operates from the L3 cache 116. The SCI 110 waits on the hit or miss decision before transferring the cycle to the host bus 24. In this manner the L3 cache 116 is configured in a serial manner logically but is physically connected in a lookaside configuration where it is parallel with, and thus readily removable from, the CPU board.

Figure 3:
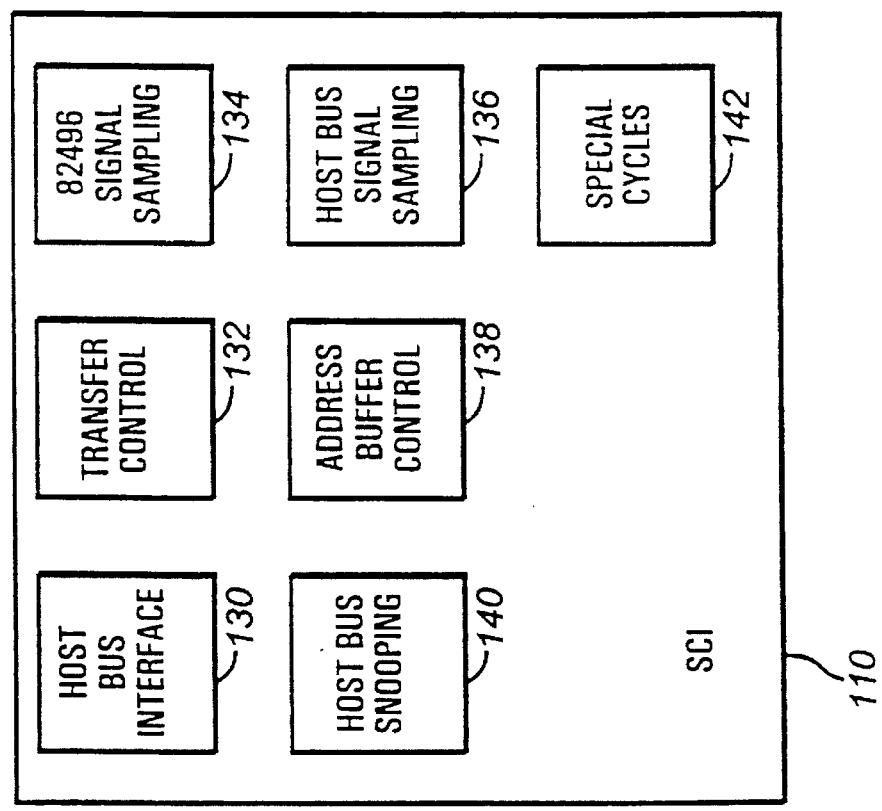
FIG. 3 is a block diagram of the system control interface of FIG. 2.

FIG. 3 illustrates the various modules in the SCI 110. The first module is the host bus interface module 130 which tracks the host bus 24 and provides various signals to other modules and provides certain host bus control signals. The second module is the transfer control module 132 which is responsible for the operation and data flow of particular cycles. The 82496 signal sampling module 134 is used to sample the various signals from the 82496 cache controller 106. The host bus signal sampling module 136 similarly samples and obtains signals from the host bus 24. The address buffer control module 138 controls the latching, driving and direction of the address buffer 112. A host bus snooping module 140 is responsible for tracking and snooping the host bus 24 to provide snoop strobes and snoop requests to the L2 cache 104 and the L3 cache 116. A special cycle module 142 handles the various special cycles developed by the Pentium processor 100.

Figure 4:
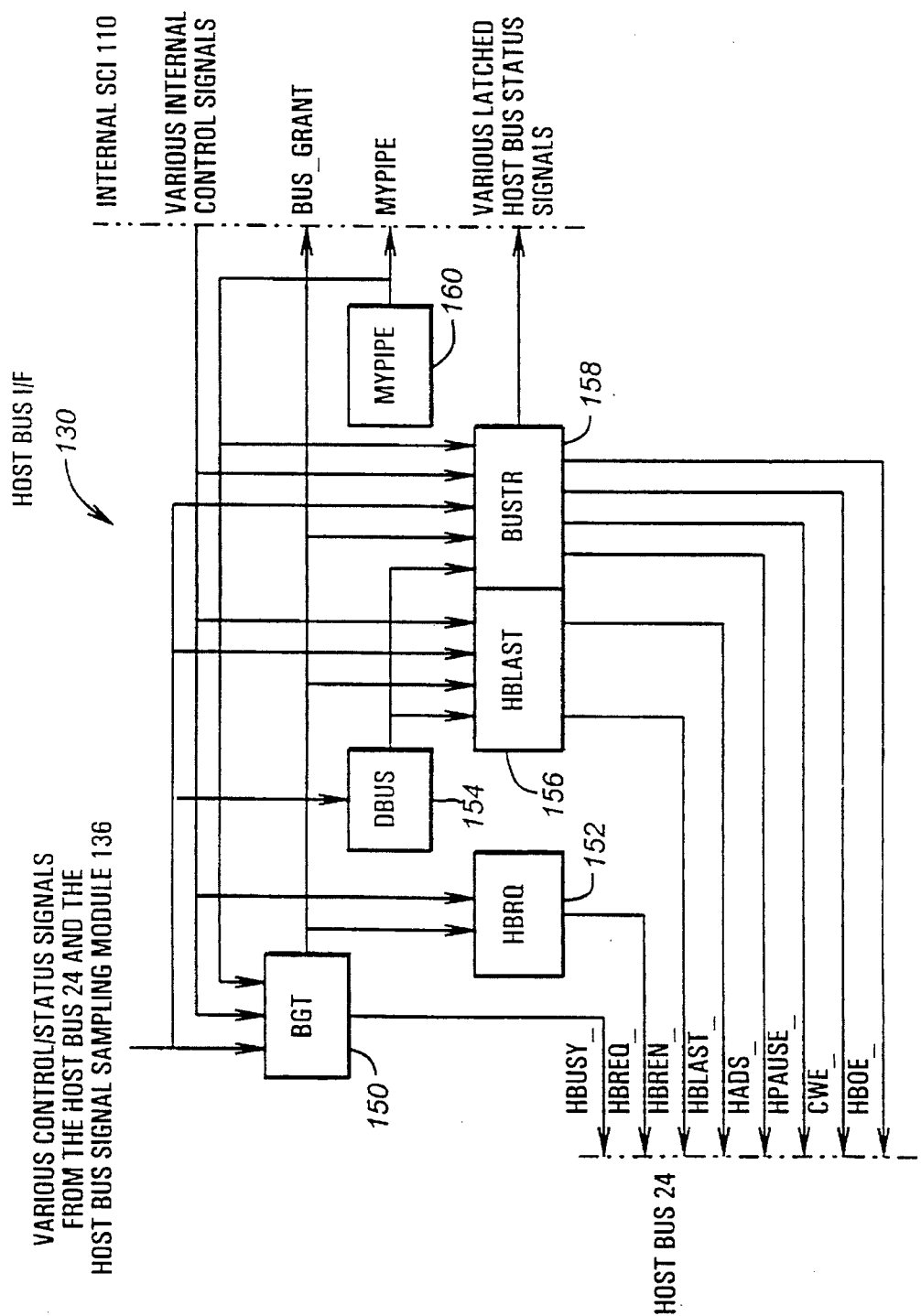
FIG. 4 is a block diagram of the host bus interface module of FIG. 3.

The Host Bus Interface Module (HBIM) 130 includes various state machines which track the progress of the host bus 24, informs other modules of the host bus status, and drives a number of host bus control signals. The six state machines are illustrated in FIG. 4 and are referred to as the BGT, HBRQ, DBUS, HBLAST, BUSTR, and MYPIPE state machines 150, 152, 154, 156, 158 and 160, respectively.

The BGT state machine 150 is responsible for tracking the ownership of the host bus 24, informing the remainder of the SCI 110 when ownership of the host bus 24 is achieved, and driving the HBUSY_ signal to the host bus 24 when the SCI 110 owns the host bus 24 to indicate that the host bus 24 is busy. The HBRQ state machine 152 is responsible for requesting ownership of the host bus 24. The HBREQ_ or host bus request signal is driven active whenever the 82496 cache controller 106 has issued a transaction which is to go to either the host bus 24 or the EISA bus 42. The HBREQ_ signal is driven inactive, either when the HBRQ state machine 152 sees that the SCI 110 owns the bus or when the HBRQ state machine 152 samples the CSNPADS_ signal from the 82496 cache controller 106, indicating an active snoop-hit to a modified line. The DBUS state machine 154 tracks the host bus 24 and determines when the host data bus is busy with another host bus master's transaction. The DBUS state machine 154 drives an internal signal, called EDBB or external data bus busy to provide this indication. The HBLAST state machine 156 tracks the host bus 24 to determine when the SCI 110 has control of the host data bus and is responsible for driving the HBLAST_ and HBREN_ signals to indicate the final cycle of an operation and to drive the data buffer 114 and is used in the control of the FIFO 122.

The BUSTR state machine 158 consists of a state machine and sample/latch/decode logic for the host bus status signals and processor 100 status signals. The BUSTR state machine 158 is responsible for driving the HADS_ , HPAUSE_ , CWE__, and HBOE__ signals. The HPAUSE__ signal is actually combined with the HPAUSE__ signal out of the host bus snooping module 140 before going out to the host bus 24 to indicate a pause in the cycle pending on the host bus 24. The HPAUSE__ signal is driven by the BUSTR state machine 158 when the SCI 110 is doing a write cycle, but data has not yet been transferred to the data buffer 114, either because the 82496 cache controller 106 has not driven the CDTS__ or data strobe signal or the SCI 110 is using the local data bus for a previous cycle, such as a read line-fill. The BUSTR state machine 158 can be pipelined on top of itself by being in more than one state at a time. This allows a single state machine to have control of the mentioned host bus control signals and have pipelining capability. The remaining logic of the BUSTR state machine 158 consists of latch-and-hold circuitry for the DDF or memory mapper 34 signals and the processor 100 status signals. It also includes decoding logic to create a synchronized write-to-own flag or WTO__FLAG signal.

The MYPIPE state machine 160 tracks the SCI 110 host bus 24 cycles and determines when the SCI 110 is pipelined at the host bus 24 on top of itself. This determination is used by various state machines to qualify the sampling of HBRDY__ or cycle ready and HBLAST__ signals active.

Figure 5:
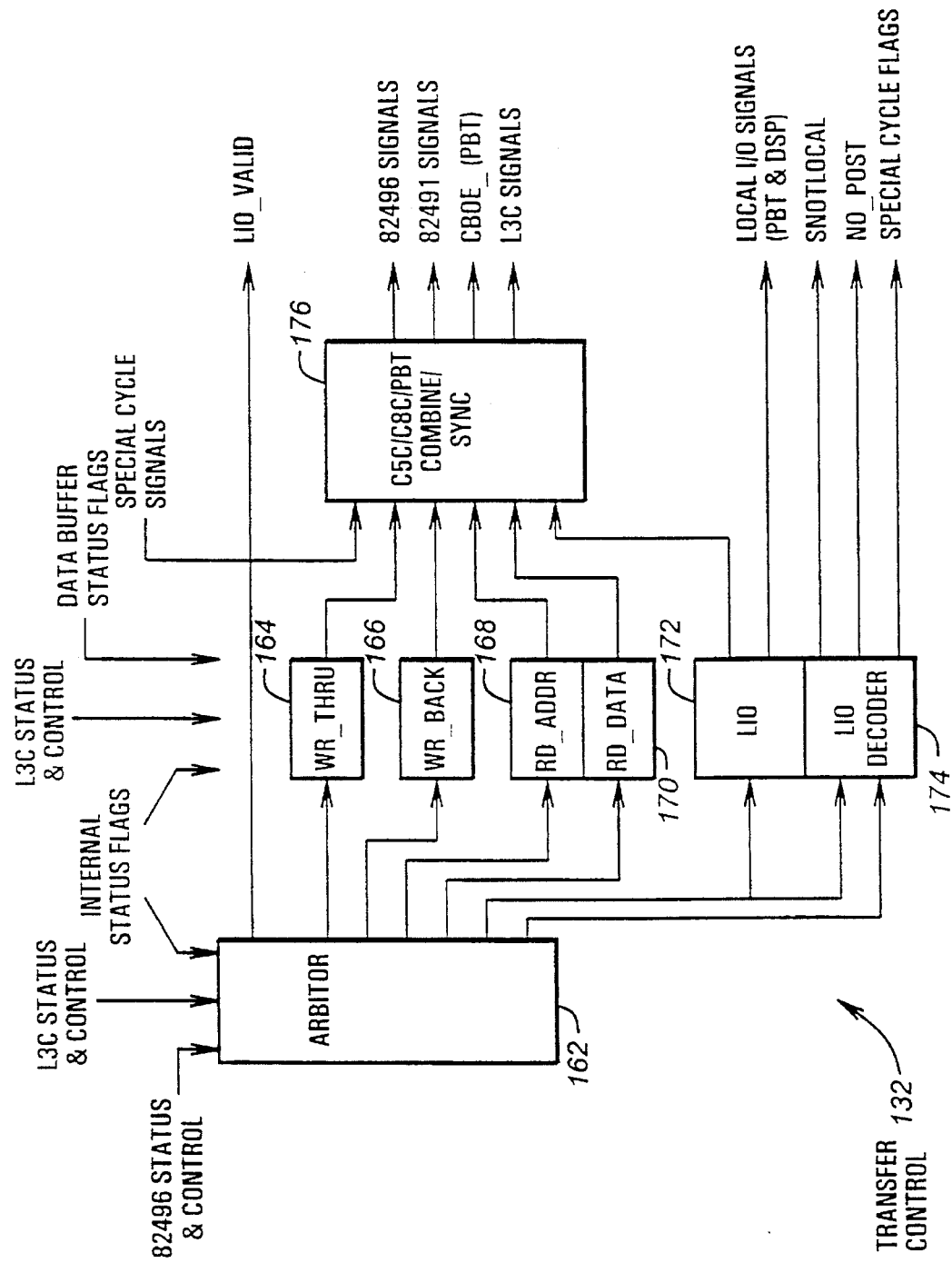
FIG. 5 is a block diagram of the transfer control module of FIG. 3.

The Transfer Control Module or TCM 132 is responsible for the operation and data flow of the cycle and is shown in more detail in FIG. 5. The transfer control module 132 includes various state machines and other submodules. The state machines include an arbitor state machine 162, a WR__ THRU state machine 164, a WR__ BACK state machine 166, a RD__ADDR state machine 168, a RD__DATA state machine 170, a local I/O or LIO state machine 172, a local I/O decoder 174 and a combine/synchronization module 176.

The arbitor state machine 162 is responsible for sampling and decoding the L2 cache 104 CADS__ address status signal, the L2 cache 104 status signals, the L3 cache 116 status signals and for initiating the cycle. For example, after the arbitor state machine 162 has sampled the CADS__ signal and the L2 cache 104 status signals and has determined that the cycle is a non-cacheable read, the arbitor state machine 162 asserts the RD__ ST signal. The RD__ST signal remains asserted until the CNA__ or cache next address signal is sampled asserted or when the CSNPADS__ signal is sampled asserted. If the cycle is a cacheable read and the L3 cache 116 is present and turned on, then the arbitor state machine 162 waits until two PCLK or processor clock cycles after receiving the L3CYCSTB__ or L3 cache 116 cycle strobe signal to sample the L3 cache 116 tag results. If the L3 cache controller 118 results indicate a hit, then the L3RD__ST signal is asserted and the data is retrieved from the L3 cache 116. If the tag result is a miss, then the cycle is performed on the host bus 24 and the data is sent to both the L3 and L2 caches 116 and 104. Similarly, if the arbitor state machine 162 determines a memory write or write allocate cycle is occurring, the appropriate signals are provided to the other state machines and modules in the SCI 110 to allow the cycle to be performed. In the case of an input/output (I/O) cycle, the arbitor state machine 162 ensures that the 82496 cache controller 106 is driving the address lines by sampling the CMOE__ or cache memory address output enable signal. If the CMOE__ signal is sampled asserted, then the arbitor state machine 162 asserts LIO__LTCH or local I/O latch signal for 1 PCLK cycle. The LIO__LTCH signal is used by the LIO decoder module 174 to latch the address lines in the LIO decoder module 174. In the next PCLK cycle, the arbitor state machine 162 asserts the LIO__ST signal for one PCLK. This is used to open the latch after the LIO decoder 174 to allow the decoded status signals flow to the LIO state machine 172 and to the Special Cycle module 142 in the case of a special cycle. The LIO__ST signal is also used by the LIO state machine 172 to initiate the state machine. If the LIO decoder 174 has determined that the cycle is to a non-local address, then it asserts the SNOTLOCAL signal. After the arbitor state machine 162 has sampled SNOTLOCAL signal active, then the arbitor state machine 162 determines if the cycle is a read or a write and issues either the RD__ ST or WR__ST signals to start the appropriate state machines.

The WR__Thru state machine 164 is responsible for all writes to the host bus 24, such as memory and I/O, potentially allocatable and non-potentially allocatable, posted and non-posted, EISA bus 42 and system memory 32. It is also responsible for write-allocates from the L3 cache 116. The WR__Thru state machine 164 controls the data flow from the 82491 cache SRAMs array 108 to the data buffer 114 and controls the status/control signals to the 82496 cache controller 106, the 82491 cache SRAM array 108 and the data buffer 114.

The WR__Back state machine 166 is responsible for both the line-replacement write-backs and the snoop-hit write-backs. As with the WR__Thru state machine 164, the WR__Back state machine 166 is responsible for the data flow from the 82491 cache SRAM array 108 to the data buffer 114. The WR__Back state machine 116 can handle either 32-byte lines or 64-byte lines, through 64 byte lines are preferred.

The RD__Addr and the RD__Data state machines 168 and 170 are responsible for all of the reads and read-allocates on the host bus 24, EISA bus 42, and the L3 cache 116. The reason for the two state machines 168 and 170 is to better handle pipelined read cycles. The RD__ Data state-machine 170 is also responsible for the data flow to the 82491 cache SRAM array 108 during write-allocates.

The LIO state machine 172 and the LIO decoder module 174 combined perform the local I/O cycles. The LIO decoder 174 receives the address, 82496 cache controller 106 status signals, and byte enable signals to determine if the requesting cycle is to go to the DSP 48, if it is to go out to the host bus 24, or if the cycle is a special cycle. The LIO decoder module 174 also determines whether an I/O write to the DSP 48 can be posted. The LIO state machine 172 handles all of the transaction for the local I/O to the data buffer 114 and DSP 48.

The Combine/Sync module 176 takes all of the common outputs from the other modules, combines the signals and synchronizes them up through a D-type flip-flop before sending the signal to an output pin. For example, the CBGT__ or bus grant signal is driven by the WR__Thru state machine 164, the WR__Back state machine 166, the RD__Addr state machine 168, the LIO state machine 172 and from the Special Cycle module 142. The signals are ANDed together and the output of the AND gate is sent through a D-type flip-flop which is clocked with the PCLK signal. The output of the flip-flop is then sent to the CBGT__ output pin.

The 82496 signal sampling module 134 samples, latches and holds various control/status 82496 cache controller 106 signals which the SCI 110 uses throughout the transaction.

The host bus signal sampling module 136 consists of three modules. The first is the HBRDY module which is responsible for tracking the HBRDY__ and HBLAST__ signals. When both the HBRDY__ and HBLAST__ signals are sampled active on the rising edge of HCLK or host bus 24 clock signal, then the HBRDY_ signal is masked out during the next HCLK cycle. This is done to prevent any problems since the HBRDY_ signal can go to an unknown state in the HCLK cycle after the HBRDY_ and HBLAST_ signals. The second module is the LHBOFF module. This module samples the HBOFF_ or back off signal and drives the LHBOFF_ or latched HBOFF_ signal active when the HBOFF_ signal is sampled asserted. The LHBOFF_ signal is held asserted until the HBRDY_ and HBLAST_ signals of the backed off cycle are sampled asserted. The third module is the CE_RTRY module. This module is used for EISA cycles. The module creates four signals: CE_RTRY, EISA_FLAG, EISA_RST, and LH_ EISA_ RST. The CE_ RTRY_ signal is a combination of the E_ RTRY_ and LE_ RTRY_ signals if the cycle is a locked EISA cycle. EISA_FLAG is driven active for one HCLK signal cycle after the module has determined that the current EISA cycle will not be E_RTRYed off but will get posted. Both the EISA_RST and LH_EISA_RST signals are driven active after the module has determined that the current EISA cycle has been E_RTRYed off. The LH_EISA_RST signal is a latch-and-hold signal which is held asserted until the SCI 110 regains control of the bus and CE_RTRY signal is inactive. More details on the retry signals are provided in Ser. No. 07/955,930, filed Oct. 2, 1992 and entitled "SPLIT TRANSACTION AND PIPELINED ARBITRATION OF MICROPROCESSORS IN A MULTIPROCESSING COMPUTER SYSTEM", which is hereby incorporated by reference.

The address buffer control module 138 includes an ADDR state machine and an HSTAT module. The ADDR state machine controls the latch, drive, and direction of the address buffer 112. It also controls the latch and drive of the host bus status signal out of the HSTAT module. The HSTAT module consists of registers and combinitorial logic used to create the host bus status signals from the L2 cache 104 status signals.

The host bus snooping module 140 consists of two state machines. The first state machine is responsible for tracking the host bus 24 and the snooping signals and for providing various status flags to the SCI 110 to indicate that a snoop is to occur and the status of the snoop. The second state machine is responsible for performing the snoop request. It is also responsible for driving the HPAUSE_, HSHARED_, and HBOFF_ signals onto the host bus 24. If a snoop hit to a modified line is detected, the state machine drives the WB_ST signal, which is ORed with the arbitor 162 WB_ST signal to indicate a write-back cycle is to occur.

The Special Cycle module 142 consists of three modules: HRESET, SCYC, and SSCC. The HRESET module drives PINIT and all of the configuration lines to the L2 cache 104 during hard reset. The SCYC module handles all of the special cycles. Six special cycles are initiated by the Pentium processor 100: HALT, SHUTDOWN, INVD, WBINVD, FLUSH ACKNOWLEDGE, and BRANCH TRACE MESSAGE. Two special cycles occur from signals driven by the DSP 48: soft reset and cache disable/enable. The SSCC module is responsible for providing the CBGT_, CBRDY_, and CRDY_ signals to complete the processor initiated special cycles.

Figure 6:
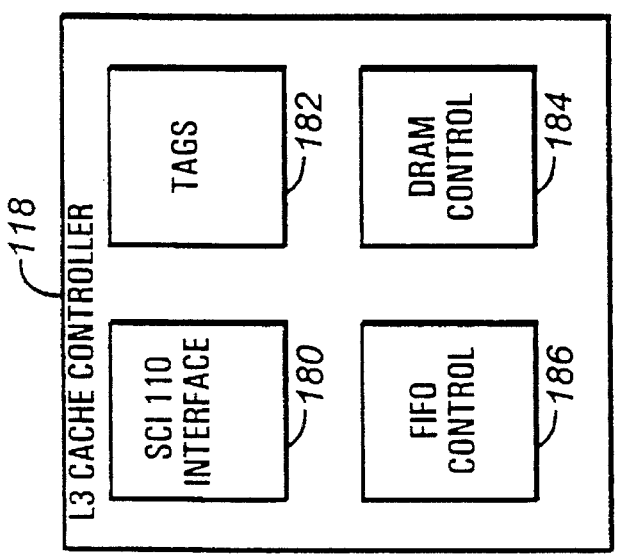
FIG. 6 is a block diagram of the L3 cache controller of FIG. 2.

The L3 cache controller 118 is shown in more detail in FIG. 6. It includes four modules: an SCI 110 interface 180, a tag module 182, a DRAM control module 184 and a FIFO control module 186. The SCI 110 interface 180 interfaces with the SCI 110 to interpret the various signals provided and responds with various outputs. The tag module 182 includes a state machine for controlling the tag memories 120 and various latching and comparator logic to provide indexes and to determine if a hit has been obtained for the particular address. The DRAM control module 184 includes a state machine to control operation of the DRAM array 124. FIFO control module 186 controls operations of the FIFO 122 so that data can properly be provided to and from the DRAM array 124.

The response of the L3 cache 116 to the various local bus cycles is described in Table 1 provided at the end of this description.

For clarity, the SCI 110 response to the same processor 100 and host bus 24 cycles is also included in the response matrix table, indicating its response to the hit/miss determination in the L3 cache 116. Of particular interest is the SCI 110 response to a processor potentially-allocatable write, since an L3 cache 116 hit may result in no cycles at all being run on the host bus 24 in spite of the fact that the L3 cache 116 does not implement a write-back cache protocol. This is the benefit of maintaining an 'exclusive' state in the L3 cache 116 tag. Table 1 shows that the SCI 110 looks up snoop read cycles in the L3 cache 116 to inform other system caches whether the data they want to allocate should be tagged as Shared or not. The SCI 110 drives the HSHARED signal when a snoop read hit to the L3 cache 116 is detected. The L3 cache 116 may need to respond to these snoop read hits by downgrading its tag status from exclusive to shared.

Another feature of the L3 cache 116 design is the caching of write-back cycles from the 82496 cache controller 106. This is a modified version of a technique referred to as 'Victim Caching'. It improves the hit rate by saving data thrown out by the L2 cache 104, previously cached as Modified in the case of the 82496 cache controller 106, in case data modified in the recent past will be needed again soon. Note that locked processor 100 cycles will not be cached. This prevents the need for a special back-off signal on the host bus 24 to avoid a potential 'dead-locked' condition that could result from more than one CPU running locked cycles at the same time. In addition, it avoids the added complexity that would be needed to ensure atomic cycles on the host bus 24 for the locked cycles. Locked write hits will invalidate the L3 cache 116 location, since saving the results of locked writes would only be useful if the locked cycles are followed by an unlocked read to the same location.

In Table 2, the state transitions for the L3 cache 116 status for each of the cache bus cycles are shown as an aid in debugging. Table 2 is provided following Table 1.

Figure 7:
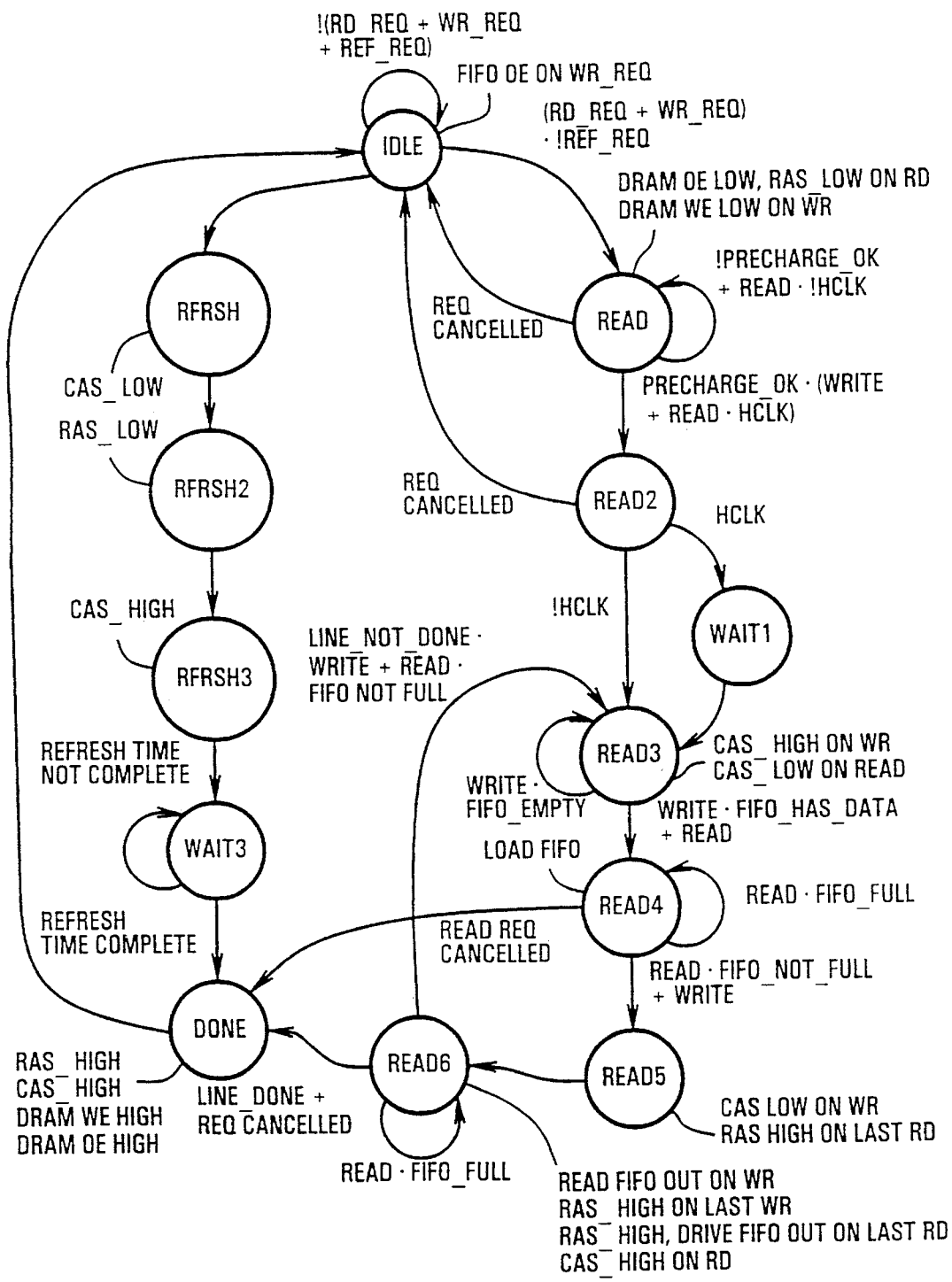
FIG. 7 is a state machine illustration of the DRAM array operations of the L3 cache of FIG. 2.

As noted above, the DRAM array 124 is preferably either 2 or 4 MB in size. For the 2-MB option, the DRAM array 124 is made up of four 256k×18 DRAMs, with an access time of 70 ns. The control for this memory is contained in the DRAM control module 184. The state machine which forms the core of the DRAM control module 184 is shown in FIG. 7. The various state transition conditions and main control signal states are indicated. The state transition signals, such as the cycle type, are based on the status signals on the local bus and control signals provided by the SCI 110. They have been simplified for ease of understanding. The L3RDF2_ and L3WRF1_ signals are the data out and data in strobes of the FIFO 122. The L3MOE_ signal is the FIFO 122 data output enable signal to the DRAM array 124, while the DOE_ signal is the FIFO 122 data output enable signal to the local bus.

The addresses for the DRAM array 124 are constructed from the 82496 cache controller 106 addresses as follows:

Row Address= Addr[20], way, Addr[19:12]; where way is the way selected by the match information from the tag lookup. Column Addr=Addr[20], Addr[11:6], (Addr[5:3] XOR Address Counter[2:0]); where the address counter is a 3-bit counter that keeps track of which of the 8 64 bit transfers for a read or write operation is currently in progress. The L3 cache 116 is preferably organized as a two way cache for an improved hit rate.

Figure 8:
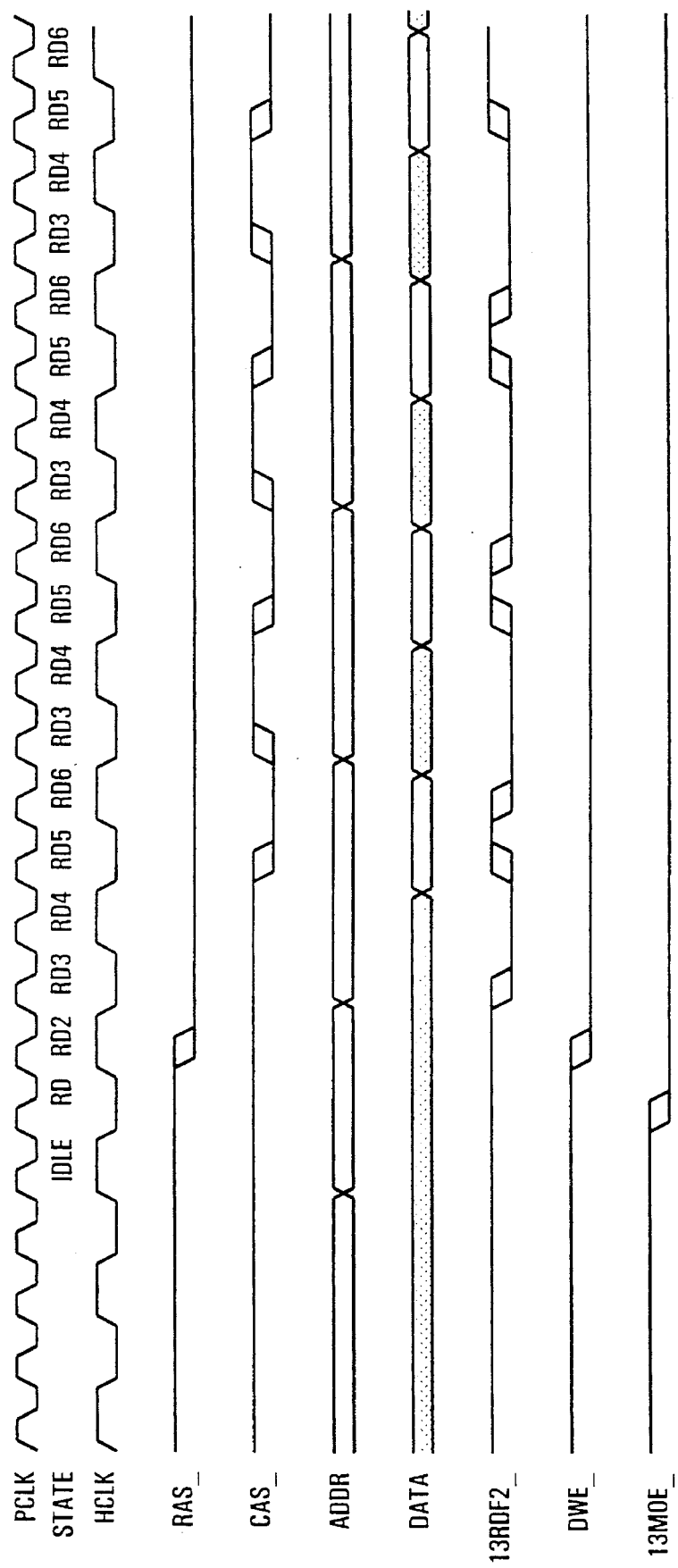
FIGS. 8 and 9 are timing diagrams of operations of the dynamic random access memory (DRAM) array of FIG. 2.
Figure 9:
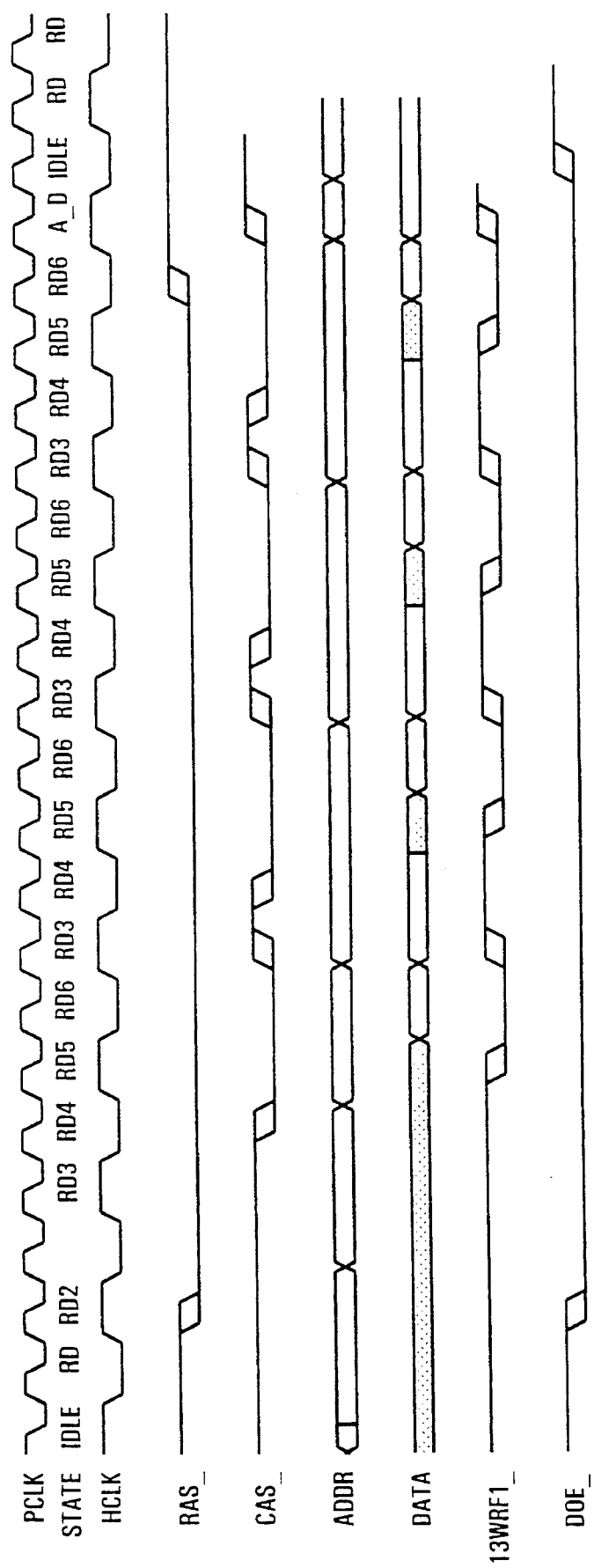

The timing of the DRAM array 124 accesses is instructive in determining the performance capabilities and limitations of the L3 cache 116, since the timing delineates how many clocks must be allowed for each access. FIG. 8 illustrates an illustrative read cycle, while FIG. 9 illustrates an illustrative write cycle. It is noted that only four of the eight transfers are shown. The operations of the remaining four transfers are similar, though slightly delayed to allow the FIFO 122 to be emptied or filled.

Figure 10:
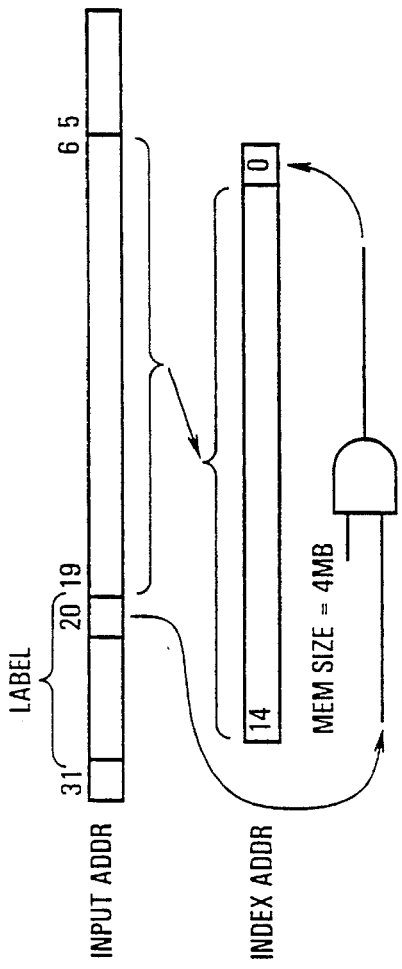
FIG. 10 is a diagram illustrating the addressing of the tag static random access memories (SRAMs) of FIG. 2.
Figure 11:
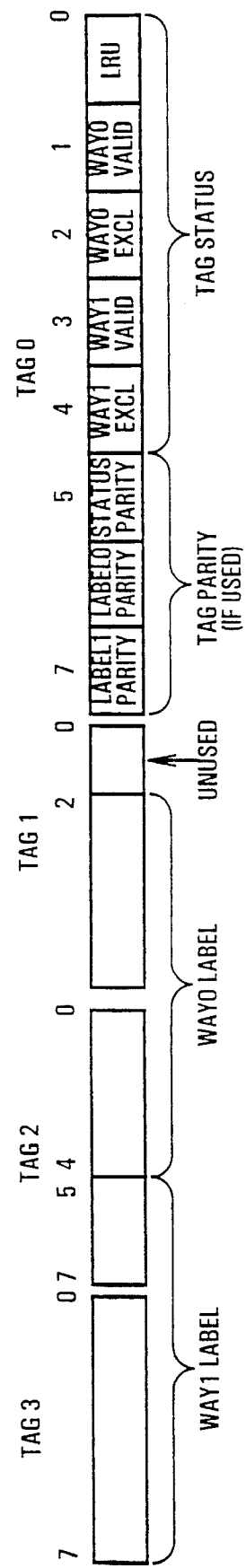
FIG. 11 is a diagram illustrating the data of the tag SRAMs of FIG. 2.

The amount of tag memory 120 is determined by dividing the DRAM array 124 size by the line size, the number of lines per block, and the number of ways. Since the DRAM array 124 can be a 4 MB cache memory, this results in the following equation: 4 MB/(64 bytes *1 line/block* 2 ways)= 32 k tag size. To follow through on the memory requirements for the 4-MB option, a 15-bit index address is needed to access 32 k addresses, and defines what the tag SRAM depth must be. Since the cacheable address space is limited in the preferred embodiment to 2 GB, only 31 of the processor address bits need to be examined for determination of an address match. Of these, 6 are needed to select any of the 64 bytes in the line and 14 are needed to select the block index, leaving 11 bits for the label information. This is illustrated in FIG. 10. Five bits of status are needed, 1 valid bit per line per way plus 1 WB/exclusive bit per line per way plus 1 LRU bit for the line replacement algorithm, the total tag memory width is 10+10+5 or 25 bits. To accommodate this width, and because the 4-MB option requires an extra bit in the index field resulting in a depth of 32, in the preferred implementation the tag SRAM array 120 consists of four 32 k×8 SRAMs. FIG. 11 shows how the data fields are split across the 4 SRAMs. Note that since sub-line accesses, accesses to less than a full line of data, are not allowed in the L3 cache 116, there is no need for the L3 cache 116 to take in the 3 lowest byte select bits, although bits 4 and 3 are needed for quad-word accesses by the cache data DRAMs array 124.

The fields of the local bus address which are used to access the tag SRAM array 120 depend on the size of the DRAM array 124 being used. If the DRAM array 124 size is 2 MB, address bit 20 is not needed. If the DRAM array 124 size is 4 MB, then the index address field includes bit 20. Note that in the 4-MB case, bit 20 is used in both the index and label fields for simplicity.

To clarify the bit ordering, the tag index is not created from the bits in bit-wise order. Instead, bits [19:6] are the core address, and bit 20 is appended to the least significant bit, so that the bit ordering is: Tag Index= Address[19:6], Address[20]. For the 2-MB option, bit 20 is gated off, so the index is simply Address[19:6] with an extra zero in the lowest order bit.

The Exclusive bit in each way is included in the tag status to indicate to the SCI 110 whether a location is shared by other caches in the computer system C. This information is helpful when a write-allocate cycle is run by the 82496 cache controller 106, since a hit in the L3 cache 116 that is tagged as "exclusive" means that the SCI 110 does not have to run any host bus 24 cycles at all, even when the cycle is a write. This occurs because the WB/WT signal from the SCI 110 that is stored in the L3 cache 116 tag on an allocate indicates that data from the host bus 24 is both write-backable and not shared by other caches. The write-backable nature is provided by the memory mapper 24, which stores this information for each block of memory, while the not shared status is indicated by the HSHARED_ signal on the host bus 24 which is driven by other CPUs on snoop read hits. The L3 cache 116 maintains the integrity of this information by snooping host bus 24 read cycles and changing the status when that location is snooped. Using this information, the SCI 110 decision is simplified: if the access is a miss to the L3 cache 116 or a hit but not exclusive, the SCI 110 must run the write-allocate cycle on the host bus 24; otherwise the cycle can be treated as an L3 cache 116 read hit, so that no host bus 24 access is required.

Figure 12:
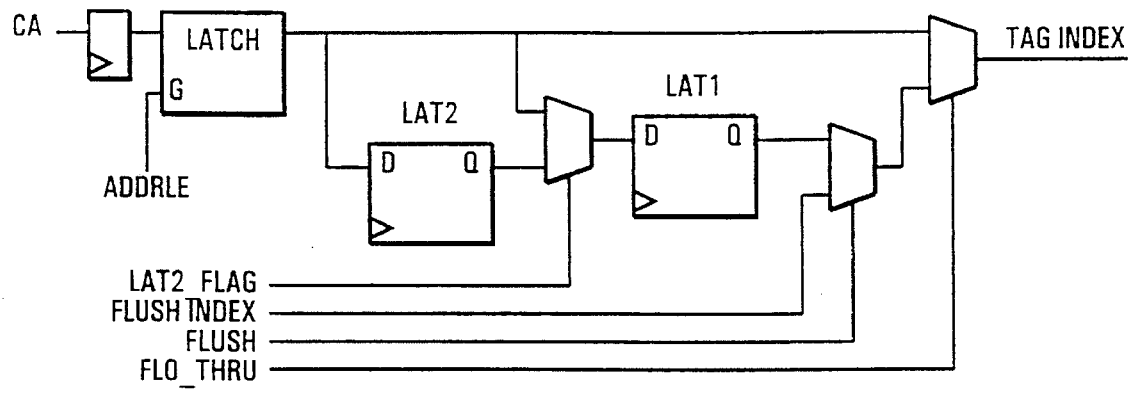
FIG. 12 is a schematic diagram of index address logic of the tag module of FIG. 6.

For added clarity, the tag address multiplexing scheme is shown in FIG. 12. This shows the basic address switching scheme for the tag index, as well as the synchronizing flip-flops on the address inputs and some of the control signals for the multiplexers. The terms used to store the address in the two latches are a function of the tag state machine (described below) and the CADS_ and CMOE_ inputs. Basically, an address is stored in the first latch when it will be needed later, as would be the case for an allocate, where the address and cycle type are known as soon as the tag is looked up, but the data will not arrive for some time. Since a snoop cycle can occur before the allocate data is returned, and since the tag update cannot be completed until then because the memory mapper 34 does not return the Exclusive information for the data until then, the address must be held in a separate latch. If another CPU cycle arrives, a pipelined cycle, while an address is already being held in the first latch, the new address is saved in the second latch until it can be looked up. The term that controls which address is being accessed at a given time is the FLO THRU signal and is derived from information about which latches are full and what cycles are being run. Similarly, the address latch enable or ADDRLE signal that holds the current address is derived from a number of internal states and external conditions to hold the address as long as needed.

Figure 13:
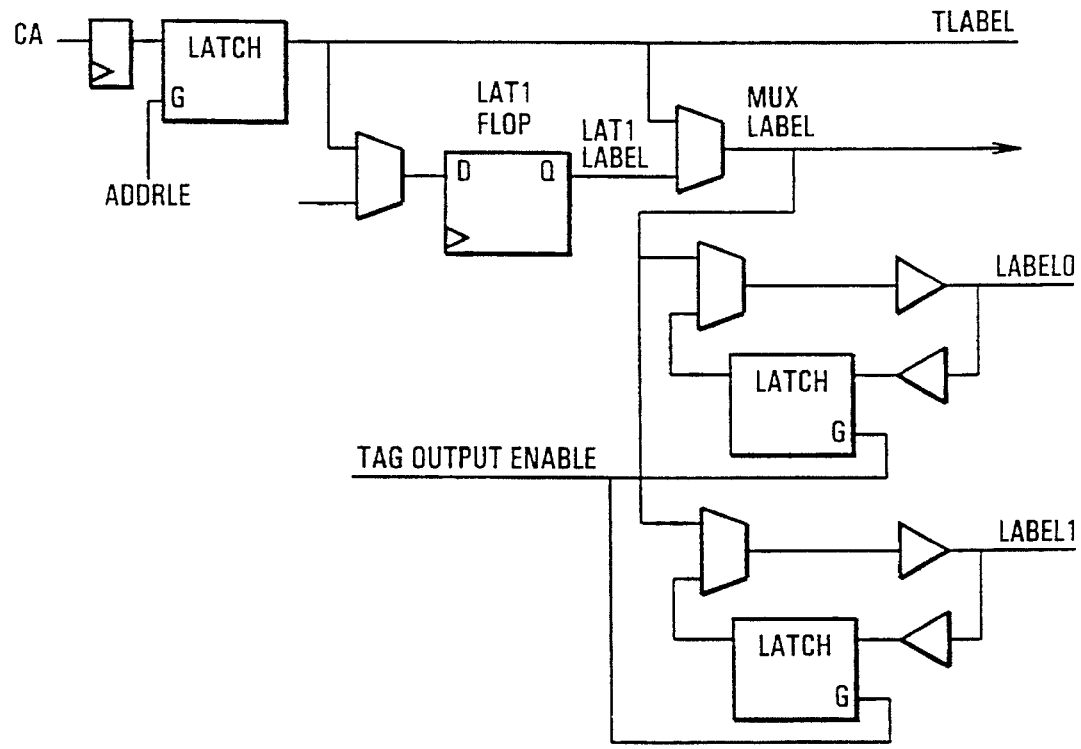
FIG. 13 is a schematic diagram of tag label logic of the tag module of FIG. 6.

The tag label information must also be stored in the address latches, since it is possible that the access for the stored address has not yet been looked up in the tag. In this case, when the address is ready to be looked up, the label part is used for comparison and can be written into the tags in the event that an update is needed. The connections for the labels are shown in FIG. 13. The output of the final multiplexer is the label used for comparison to the address of the pending cycle, which along with the valid bit in the tag status is used to determine a hit or miss, as is conventional in cache controllers. The hit or miss is indicated in the L3HIT/MISS signal. It is noted that two comparator arrangements are utilized as the L3 cache 116 is a two way cache.

Figure 14:
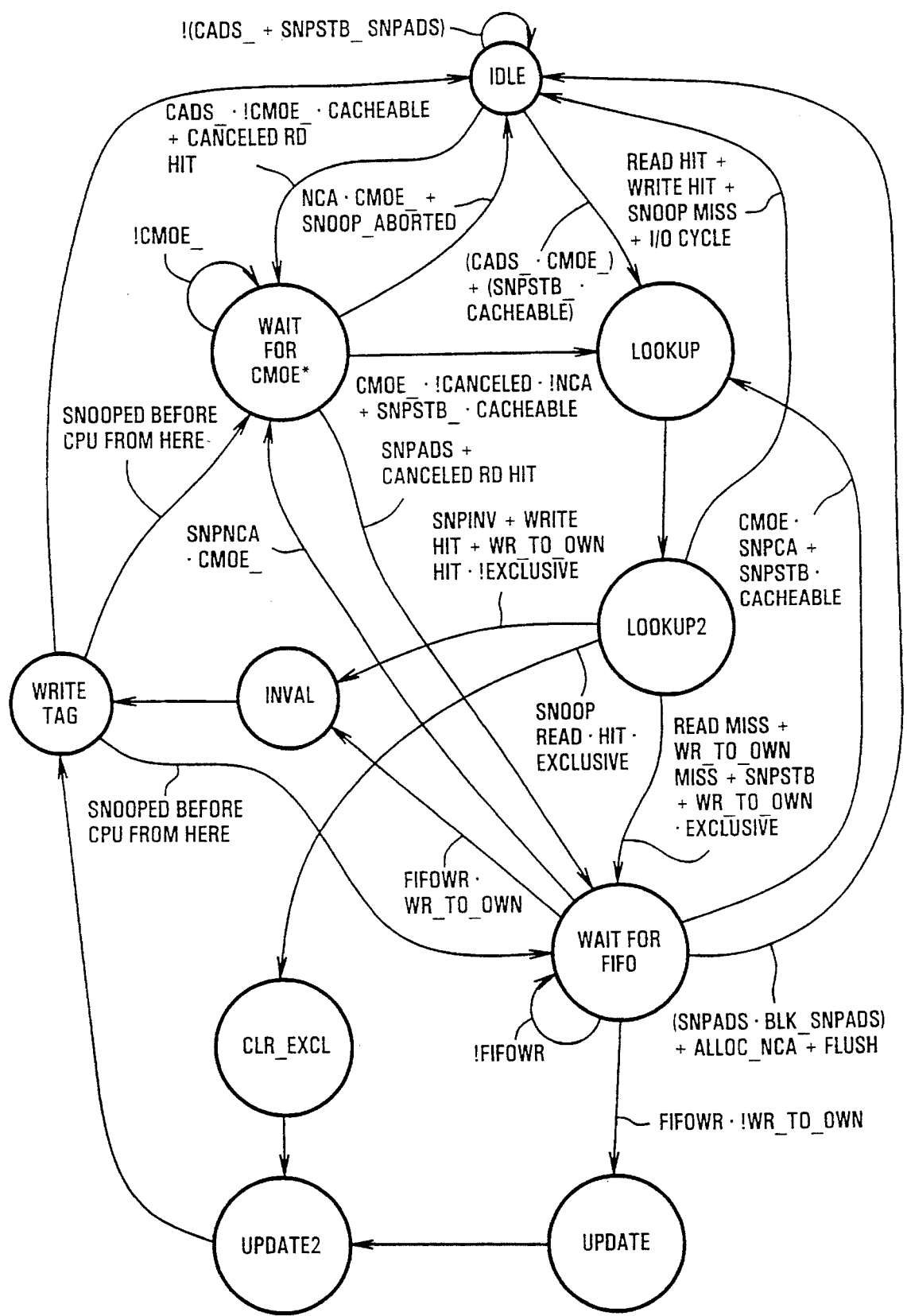
FIG. 14 is a simplified stater machine illustrated operations of the tag SRAMs of FIG. 2.
Figure 15:
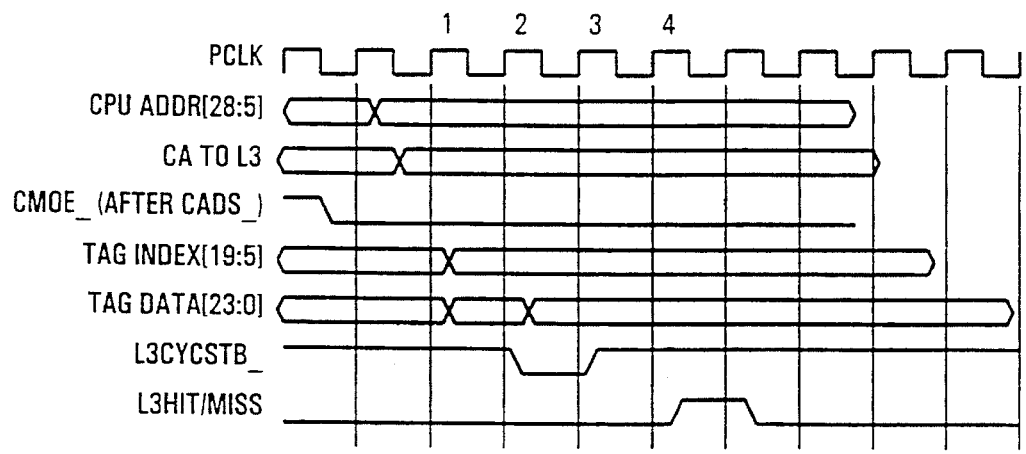
FIGS. 15 and 16 are timing diagrams of operations of the tag SRAMs of FIG. 2.
Figure 16:
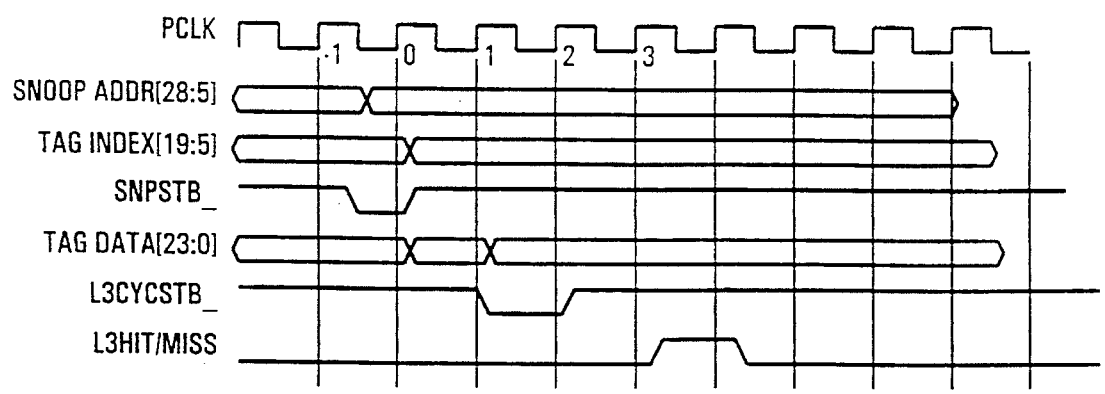

The "master" state machine for the L3 cache controller 116 is the one that controls the tag memory accesses, since the heart of a cache controller operation is testing the tag contents for a hit or miss with each memory access. The state diagram for the tag state machine is shown in simplified form in FIG. 14. A simplified version is used to illustrate all the possible states and the normal flow of operation for the state machine. Certain possible exception cases, such as a snoop invalidate that interrupts the state machine while it is waiting for the CMOE_ signal or a FIFOWR input are not shown. Timing of exemplary lookup cycles of the tag SRAMs 120 are shown in FIGS. 15 and 16. FIG. 15 is a processor operation while FIG. 16 is a snoop operation. The L3CYCSTB_ signal, which indicates to the SCI 110 that the tag lookup is occurring and a hit or miss result will soon be provided is issued in the LOOKUP state.

The interface between the DRAM array 124 and the local bus requires that the FIFO 122 can load from one side and unload from the other side at different times. In the preferred embodiment a pair of Hitachi HD64982F devices are utilized. Because several write-back/allocates can be queued up to run on the bus, limited only by the host bus 24 bandwidth, as the host bus 24 accommodates single HCLK signal writes during a burst with only one HCLK cycle between write-back bursts, the situation can arise wherein the DRAM array 124 will not be able to keep up with the host bus 24. As a result, the L3 cache controller 118 needs a mechanism to throttle the data bus. This is accomplished by the L3STALL signal, which is generated to the SCI 110 when the input portion of the FIFO 122 does not have room to store another line. The SCI 110 responds to this input by postponing the next burst until the L3STALL signal is deasserted.

A description of various cycles is provided to further explain the operation of the L3 cache 116.

Snoop Cycles

The SNPSTB_ signal from the SCI 110 indicates that a snoop cycle has been observed on the host bus 24 and will be used by the L3 cache 116 to sample the snoop address. The SNPINV signal which indicates that the current snoop is a write or locked read cycle, and the SNPNCA signal indicates whether the snoop was generated by a device that will not cache data, such as a non-caching bus master. If the SNPINV signal is active and the address is found in the tag, that location is invalidated. When the SNPINV signal is inactive during a snoop read and the SNPNCA signal is inactive, the L3HIT signal is used by the SCI 110 for generating the HSHARED output to the rest of the system. In the event of a snoop read hit that is not an invalidate cycle, the L3 cache 116 must clear the L3EXCL bit for the particular way, since the accessed location may now be shared by other caches in the system. Write-backs caused by a snoop read cycle are victim-cached in L3 cache 116, but those caused by a snoop write cycle are not cached, since they are seen with the SNPINV signal and also are allocated to Exclusive by the CPU that initiated the snoop cycle. When the SNPNCA signal is active and the SNPINV signal is not, the cycle is ignored by the L3 cache 116.

The L3CYCSTB signal is used for most snoop and processor accesses to L3 cache 116. However, in the case of a snoop, it indicates that L3 cache 116 has started the tag lookup caused by the SNPSTB* input. If this signal is not seen by the SCI 110 within a specific time, the SCI 110 must drive the HPAUSE signal to make the host bus 24 wait until the cycle can be snooped by L3 cache 116. Note that the L3CYCSTB signal tells the SCI 110 that the hit/miss determination is available on the second PCLK following it.

To simplify the L3 cache 116 state machines, the tag SRAMs 120 are not updated on every tag hit, as would be necessary to implement a true least recently used or LRU algorithm. Instead, a least-recently-modified or LRM algorithm is implemented, which is less efficient, but simpler to do. The tag is updated on snoops to invalidate the location or take it from Exclusive to Shared. The only exception to this rule is a snoop read hit to a location that is already Shared. In this case, there is no need to change the tag status or LRU bit and thus no need to update the tag at all.

Write-Allocate Cycles

A write-allocate cycle is indicated on the local bus when a write takes place that is not part of a write-back, as indicated by the assertion of the CADS_, W/R, M/IO, D/C, and other control signals from the 82496 cache controller 106, and the PALLC signal is active to indicate that the location is potentially allocatable. If the access is a hit in the L3 cache 116 and the L3EXCL tag bit is set, the data are supplied from L3 cache 116 to the L2 cache 104 and no cycles need to be run on the host bus 24 since no other cache in the system C has a copy of that data line. If L3EXCL bit is not set, then the normal write-allocate cycle is run on the host bus 24. If the accessed location is a hit, the L3 cache 116 invalidates the location because the L2 cache 104 allocates the data to Modified if it can be allocated.

Read Miss-Allocate Cycles

When a read request is indicated by the 82496 cache controller 106 control signals and the CMCACHE signal is asserted to indicate that the read is considered cachable, the SCI 110 waits for the hit/miss indication from the L3 cache 116 before initiating the allocate cycle on the host bus 24. When a miss is indicated, the allocate executes on the host bus 24 and the L3 cache 116 waits for the SCI 110 to indicate that the allocate is starting. At this point, if the data can be cached, it is loaded into the FIFO 122 at the same rate that it is read into the 82491 cache SRAM array 108.

Read Hit Cycles

When a read request is initiated as in the read miss case but the location is found in the cache, the L3HIT signal indicates to the SCI 110 that a host bus 24 allocate cycle is not needed. When the FIFORDY pin is asserted by the L3 cache 116 to indicate that the data has been loaded from the DRAM array 124 into the FIFO 122, the SCI 110 asserts the L3CBOE* signal to drive the L3 cache 116 data onto the local data bus and asserts the CMBRDY signal to the 82496 cache controller 106 with appropriate timing to move the data from the L3 cache 116 to the 82491 cache SRAM array 108 as quickly as possible. The timing of this transfer ideally should be no worse than that required by the host bus 24 allocate cycle, although that concern is secondary to relieving the host bus 24 of the need to run the cycles. The rate of data transfers to and from the L3 cache 116 is limited by the speed of the DRAMs used in the DRAM array 124.

Write-Back Cycles

A write-back on the local bus, indicated by a write command with the CMCACHE signal asserted, latches each subsequent data transfer into the write portion of the FIFO 122 with the leading edge of the HCLK signal when the CMBRDY signal is asserted and the CBOE signal is not, which is true if the write-back was not caused by a snoop write or a locked snoop read cycle. Since the FIFO 122 can overflow if a number of writebacks or write-back/allocates occur in sequence, the L3STALL signal from the L3 cache 116 temporarily stops the local bus transfers and allows the transfers to memory 32 from the FIFO 122 to catch up. When the L3STALL signal is asserted, the SCI 110 holds off the next data burst until the L3 cache 116 de-asserts the L3STALL signal, indicating that it can receive another data line.

Accesses initiated by the L2 cache 104 can be preempted by snoop cycles that occur before the data has actually been transferred to or from the L2 cache 104. When the snoop results in an L2 cache 104 write-back cycle, the snooped data may be written back before the previous L2 cache 104 cycle is allowed to complete. In the case of an L2 cache 104 read or write, the cache cycle is effectively backed-off and starts over again when the write-back is complete. The case of a line replacement write-back is handled differently when the snoop that interrupted the write-back was itself a hit to the same line that was being replaced. In this case, the 82496 cache controller 106 drives the SNPADS* signal and the L3 cache 116 will have driven the L3SMLN* signal to indicate that this snoop is to the same line as the previous CPU cycle, which informs the L3 cache 116 that the previous line-replacement write-back is cancelled since the data is already being written back by the snoop cycle.

The occurrence of a read hit postponed by a snoop also gives rise to a timing issue, since the point at which the L3 cache 116 to L2 cache 104 data transfer is committed could be changed. Since the timing remains as it was for the data buffer 114, a write-back caused by a snoop is delayed by two extra HCLK cycles beyond its best case delay. This extra delay is incurred only on a snoop write-back and only when the snoop arrives within a 2-HCLK signal window during the read hit/line fill. This is an infrequent occurrence.

Bus utilization statistics have been developed. If the processor 100 is a 66 or 100 MHz Pentium, the L3 cache 116 is not installed and four processor boards were installed, the bus utilization of the host bus 24 by the CPUs alone, not counting any bus masters present in other portions of the computer system, reached over 90%, a level considered to be well into saturation of the host bus 24. When an L3 cache 116 was added to each processor board, the utilization dropped to approximately 55% for 100 MHz Pentiums and will be slightly less for 66 MHz Pentiums. These statistics were based on execution of the Oracle database program under SCO/UNIX. Exact figures vary with each application and operating system, but results are similar in all cases. This dramatic improvement indicates that the host bus 24 is no longer saturated and each CPU can perform to its maximum potential. Thus adding the L3 cache 116 greatly improves overall system performance.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

TABLE 1

L3C ASIC DESIGN SPECIFICATION
Response Matrix for the L3 Cache 116

| | Processor 100 Read | Sub-Line Write | Write with Potential Allocate | WriteBack caused by other than Snp Write | Snoop Invalidate (Wr or Locked Rd) | Snoop Rd |
|---|---|---|---|---|---|---|
| L3 Cache 116 Hit | Supply data to 82491 array 108 | Invalidate cache location | Invalidate cache location, if L3EXCL, supply allocate data 82491 array 108 | Allocate the write-back data (to excl. for line-replacement) | Invalidate cache location | Clear L3EXCL bit |
| SCI 110 Response to L3 Cache 116 Hit | No bus cycles Route data from L3C | Write data to bus | If L3EXCL, no bus cycles, route data from L3 cache 116 | Write-back to bus | Snoop 82496 106 | Snoop 82496 106 drive HSHared |
| L3 Miss Cache 116 | Allocate data, set L3EXCL if WB/WT bit is active | No other action | No other action | Allocate the write-back data (to excl. for line-replacement) | No other action | No other action |
| SCI 110 Response to L3 Cache 116 Miss | Run bus read & route data from data buffer 114 | Write data to bus | Run bus write-allocate cycles | Write-back to bus | Snoop 82496 106 | Snoop 82496 106 |
| L3 Cache 116 Locked Hit | No other action | Invalidate cache location | N/A | No other action | No Snooping | Invalidate cache location |
| SCI 110 Response to L3 Cache 116 Locked Hit | Run bus read & route data from data buffer 114 | Write data to bus | N/A | Write-back to bus | No Snooping | Snoop 82496 106 |
| L3 Cache 116 Locked Miss | No other action | No other action | N/A | No other action | No Snooping | No other action |
| SCI 110 Response to L3 Cache 116 Locked Miss | Run bus read & route data from data buffer 114 | Write data to bus | N/A | Write-back to bus | No Snooping | Snoop 82496 106 |

TABLE 2

L3C ASIC DESIGN SPECIFICATION
State-Transition Matrix for the L3 Cache 116

|  | Processor 100 Read | Sub-Line Write | Write with Potential Allocate | WriteBack | Snoop Invalidate (Wr or Locked Rd) | Snoop Rd |
|---|---|---|---|---|---|---|
| L3 Cache 116 Hit | No change | E or S—>I | E or S—>I | E, S, or I—> E, if CPU WB S, if snp WB I, if snp INV | E or S—>I | E—>S, S—>S |
| L3 Cache 116 Miss | E, S, or I—> S or E, depending on wbwt input | No Change | No Change | E, S, or I—> —> E, if CPU WB S, if snp WV I, if snp INV | No Change | No Change |
| L3 Cache 116 Locked Hit | No Change | E or S—>I | No Change | No Change | No Snooping | E or S—>I |
| L3 Cache 116 Locked Miss | No Change | No Change | No Change | No Change | No Snooping | No Change |

We claim:

1. A processor board for use in a computer system, the processor board comprising:

a microprocessor;

a first level cache system connected to said microprocessor;

a second level cache system connected to said first level cache system and larger than said first level cache system, said second level cache system being a writeback cache and operating according to a modified, exclusive, shared, invalid protocol; and a third level cache system connected to said second level cache system and larger than said second level cache system, said third level cache system being a writethrough cache and including storage of shared and exclusive status of cached data.

2. The processor board of claim 1, wherein said microprocessor and said first level cache system are contained in a single integrated circuit.

3. The processor board of claim 1, wherein a processor operation serially traverses said first, second and third cache systems if not handled by said cache systems.

4. The processor board of claim 1, wherein write allocation operations of said second level cache system are provided by said third level cache system if the data is contained in said third level cache system and said data status is exclusive.

5. A multiprocessor computer system comprising:

a bus for transferring operational cycles;

a memory system connected to said bus;

a plurality of connectors connected to said bus to allow connection to said bus; and a plurality of processor boards installed in said plurality of connectors and connected to said bus, each of said processor boards capable of controlling said bus to perform operational cycles and each of said processor boards monitoring operational cycles on said bus when not controlling said bus, wherein at least one of said plurality of processor boards includes:

a microprocessor;

a first level cache system connected to said microprocessor;

a second level cache system connected to said first level cache system and larger than said first level cache system, said second level cache system being a writeback cache and operating according to a modified, exclusive, shared, invalid protocol; and a third level cache system connected to said second level cache system and larger than said second level cache system, said third level cache system being a writethrough cache and including storage of shared and exclusive status of cached data.

6. The computer system of claim 5, wherein write allocation operations of said second level cache system are provided by said third level cache system if the data is contained in said third level cache system and said data status is exclusive.

7. The computer system of claim 5, wherein said microprocessor and said first level cache system of said at least one processor board are contained in a single integrated circuit.

8. The computer system of claim 5, wherein a processor operation serially traverses said first, second and third cache systems of said at least one processor board if not handled by said cache systems.

* * * * *